United States Patent [19]

Kurihara et al.

[11] Patent Number: 4,951,212

[45] Date of Patent: Aug. 21, 1990

[54] AUTOMOBILE DRIVING GUIDE APPARATUS

[75] Inventors: Nobuo Kurihara, Hitachiota; Minoru Osuga, Katsuta; Hideharu Takahashi, Hitachi; Akira Endo, Mito, all of Japan

[73] Assignee: Hitachi Ltd.

[21] Appl. No.: 178,922

[22] Filed: Apr. 7, 1988

[30] Foreign Application Priority Data

Apr. 8, 1987 [JP] Japan .................................. 62-84756

[51] Int. Cl.$^5$ ............................................. G06F 15/50
[52] U.S. Cl. .................................... 369/449; 340/990; 340/995; 73/178 R
[58] Field of Search ............. 364/443, 449; 73/178 R; 340/988, 990, 995; 342/450, 451

[56] References Cited

U.S. PATENT DOCUMENTS

| | | | |
|---|---|---|---|
| 4,481,584 | 11/1984 | Holland | 364/443 |
| 4,646,089 | 2/1987 | Takanabe et al. | 364/449 |
| 4,761,742 | 8/1988 | Hanabusa et al. | 364/449 |
| 4,780,717 | 10/1988 | Takanabe et al. | 340/990 |

Primary Examiner—Gary Chin

[57] ABSTRACT

In order to provide information for searching for a desired destination on the basis of the purpose of use of a facility at that destination and for selecting an optimum destination out of several candidates for a distination at which are located facilities having the same purpose of use an automobile driving guide apparatus is so configured that search information indicating the relations between the purposes of use and various destinations which satisfy that purpose is memorized in memory means, and candidates for a desired destination are indicated on a display when the driver inputs a purpose of use and a destination is indicated on the display when the driver selects and inputs a selected destination.

17 Claims, 6 Drawing Sheets

FIG. 4

| PURPOSE OF USE | OBJECTIVE POINT | MAP ADDRESS | PARKING – PHASE | | SPOT INFORMATION | |
|---|---|---|---|---|---|---|
| | | | CAPACITY | MAP ADDRESS | PRIMARY | SECONDARY |
| BANK | JOYO BANK | (---) | --- | (---) | --- | --- |
| | FUJI BANK | (---) | --- | (---) | --- | --- |
| | TOKIWA SOGO BANK | (---) | --- | (---) | --- | --- |
| DEPARTMENT STORE | ISEJIN | $(X_1, Y_1)$ | 500 | $(X_{11}, Y_{11})$ | CHILDREN'S CLOTHING | 20% DISCOUNT |
| | KISO | $(X_2, Y_2)$ | 200 | $(X_{12}, Y_{12})$ | SUMMER CLOTHING | GREAT CLEARANCE |
| | DAIEI | $(X_3, Y_3)$ | 300 | $(X_{31}, Y_{31})$ | FUR COAT | HALF-PRICE |
| MARKET | KASUMI STORE | (---) | --- | (---) | --- | --- |
| | K MART | (---) | --- | (---) | --- | --- |
| | IBKO DAILY | (---) | --- | (---) | --- | --- |
| MOVIE THEATER | KEIO PLAZA | (---) | --- | (---) | KITTY TALE | UNTIL OCTOBER 10 |
| | TOEI CINEMA | (---) | --- | (---) | --- | --- |
| | SKY CINEMA | (---) | --- | (---) | | |
| SERVICE STATION | IDEMITSU | (---) | | | | |
| | SHELL | | | | | |

AUTOMOBILE DRIVING GUIDE APPARATUS

BACKGROUND OF THE INVENTION

The present invention relates to an automobile driving guide apparatus, and in particular to an automobile driving guide apparatus which provides a driver with various information relating to and objective point or desired location or destination, so that the driver may select a desired destination when the driver cannot directly determined the location of such destination.

Such an automobile driving guide apparatus is proposed in JP-A-59-85599. In this apparatus, a road map is displayed on a display on the basis of information supplied from a memory which stores road map information, and the position of the driver's own automobile is detected and displayed on the map by the display. In addition, road traffic information, such as road jam information and accident information, is received from a road service center and is also shown on the display.

When the driver forgets or is unfamiliar with the location or name of the destination or when the place satisfying the purpose for the trip, such as to go to a shopping center, a sightseeing point or a game location, i.e., the specific destination itself, is not definite or known, the conventional automobile driving guide apparatus does not satisfactorily meet the driver's demand.

SUMMARY OF THE INVENTION

An object of the present invention is to provide information for searching for a destination or location of a facility on the basis of the purpose of use of the facility or for selecting an optimum destination out of several candidates for a destination.

In accordance with the present invention, therefore, search information indicating the relations between the purposes of use of a facility, i.e. a bank, grocery store or the like, and the various destinations which satisfy such purpose is stored in a memory to indicate candidates for the destination on the display when the driver inputs the purpose of use and to indicate a destination on the display when the driver selects the identity of the destination and inputs it to the apparatus.

BRIEF DESCRIPTION OF THE DRAWING

FIG. 4 is a diagram of destination information data stored in a search information memory unit.

DESCRIPTION OF THE PREFERRED EMBODIMENTS

Figure 1:
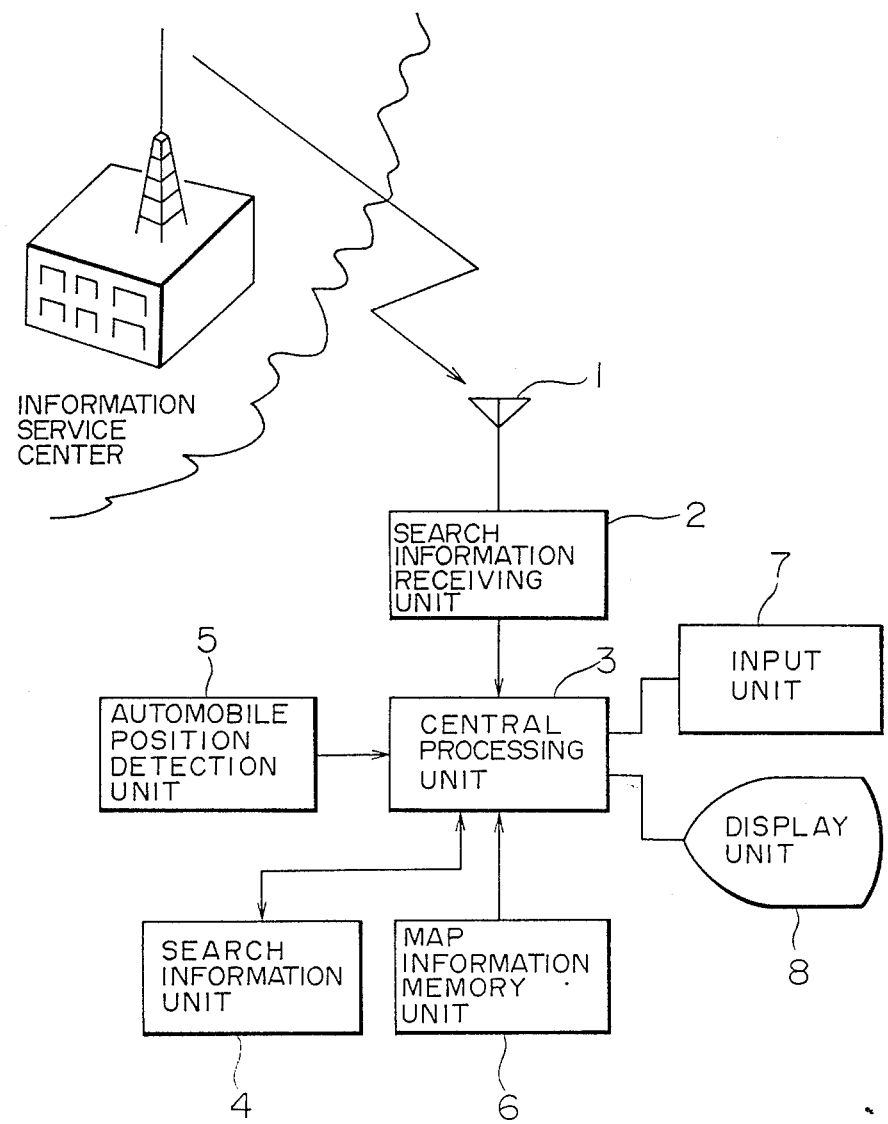
FIG. 1 is a schematic diagram of an embodiment of an automobile driving guide apparatus according to the present invention.

An embodiment of the present invention will now be described by referring to FIGS. 1 to 8. FIG. 1 shows the configuration of an automobile driving guide apparatus according to the present invention. As the basic configuration, the apparatus includes an automobile position detection unit 5, a search information unit 4, a map information memory unit 6, an input unit 7, a display unit 8 and a central processing unit 3. When an information service center is available for use, an antenna 1 and a search information receiving unit 2 are also provided. In the automobile position detection unit 5 of this automobile driving guide apparatus, the position of the automobile itself is integrally computed by using a direction sensor for detecting the direction of an automobile and a traveling distance sensor. The data indicating the position of the automobile itself is computed periodically and transmitted to the central processing unit 3. The central processing unit 3 reads out road map data including position data indicating the position of the driver's automobile from the map information memory unit 6 and displays the road map on the display unit 8. The position of the driver's automobile itself is indicated clearly by a symbol and also possibly by special coloring. The driver turns on a switch of the input unit 7 to inform the central processing unit 3 of the start of information input to the system. The driver then inputs the purpose of use of a facility by means of a voice message, for example. The central processing unit 3 searches all of the stored information indicating destinations in the vicinity relating to such purpose of use and their position in the search information memory unit 4 and clearly indicates a plurality of destinations on the road map shown in the display unit 8 using respective numerals. The driver selects one of these numerals and turns on the switch of the input unit 7 to input the selected numeral by voice. The central processing unit 3 leaves the display of the objective point corresponding to the selected numeral and removes the display of other candidates for the desired destination. The central processing unit 3 searches information relating to the pertinent destination and indicates it on the display unit 8.

Figure 2:
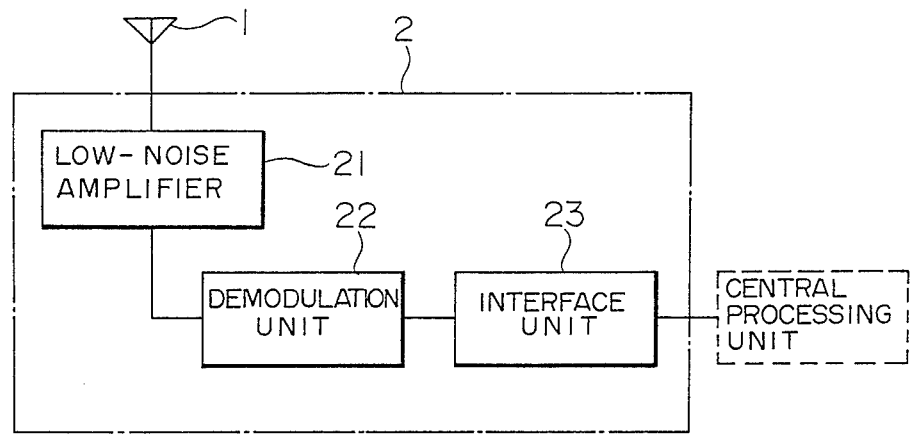
FIG. 2 is a schematic diagram of an information receiving unit which is a component of the apparatus shown in FIG. 1.

In case communication information from an information service center is available, a search information receiving unit 2 as shown in FIG. 2 is provided. Radio information received by the antenna 1 is sent to a demodulation unit 22 via a low-noise amplifier 21 and then is inputted to the central processing unit 3 via an interface unit 23.

The information service center supplies daily shopping information by radio transmission. The information includes different kinds of current consumer information, such as oil and their prices at a service station, the availability of parking places at shopping locations, advertisement information including the existence of a bargain sale for clothing, foodstuffs, daily necessaries, precious metals, amusement as well as sports goods, and pictures being shown at various movie theaters.

Figure 3:
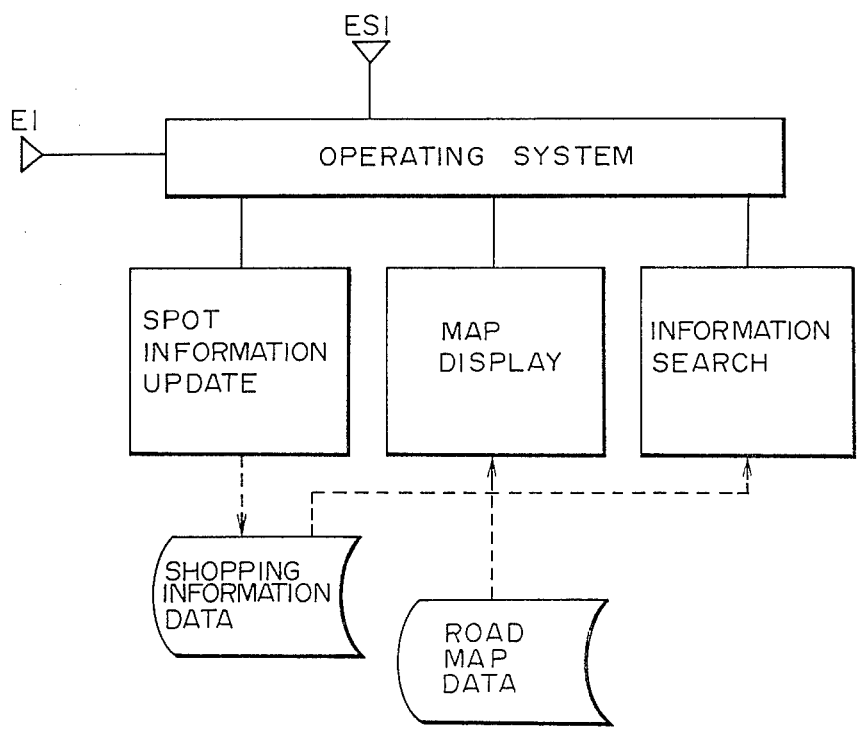
FIG. 3 is a software configuration diagram of a central processing unit which is a component of the apparatus shown in FIG. 1.

FIG. 3 shows the software configuration of the central processing unit 3. In response to a power supply interrupt ESI and an external interrupt EI supplied from the switch of the input unit, the operating system starts a spot information update program, a map display program and an information search program.

Figure 5:
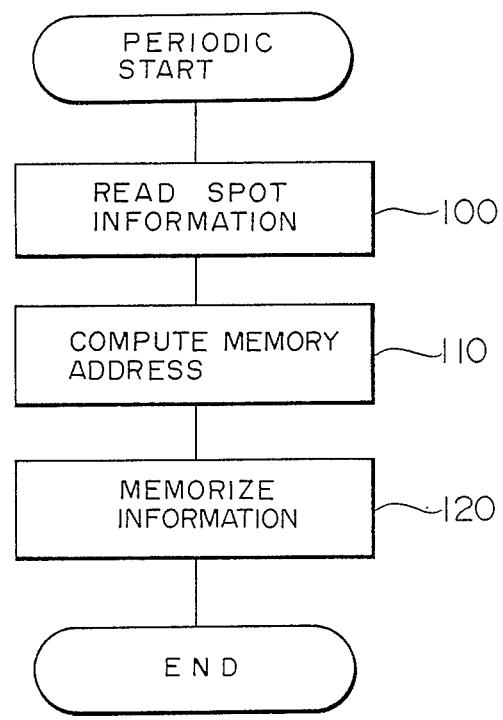
FIG. 5 shows a spot information search program.

Data stored in the search information memory unit 4 includes shopping information data, examples of which are shown in FIG. 4. As purposes of use, bank, department store, market, movie theater, service station, and names of goods such as cigarettes, Western food, Japanese food, a haberdashery, Japanese clothes and shoes are stored in memory. For each of these purposes of use, fixed information, such as a location and its related map address, and parking-place information and its map address, and bargain sales are stored as spot information. FIG. 5 shows the processing procedure of the spot information update program. The column of the spot information shown in FIG. 4 is rewritten using received data. To be more specific, the spot information shown in FIG. 4 is periodically read at step 100. The memory address location in which the information thus read should be stored is computed at step 110. This computation may be performed by assigning a code to the spot information to derive a memory address. When a memory address has been derived at step 120, the spot information is stored. By periodically repeating these steps, the spot information is updated to the latest information.

Figure 6:
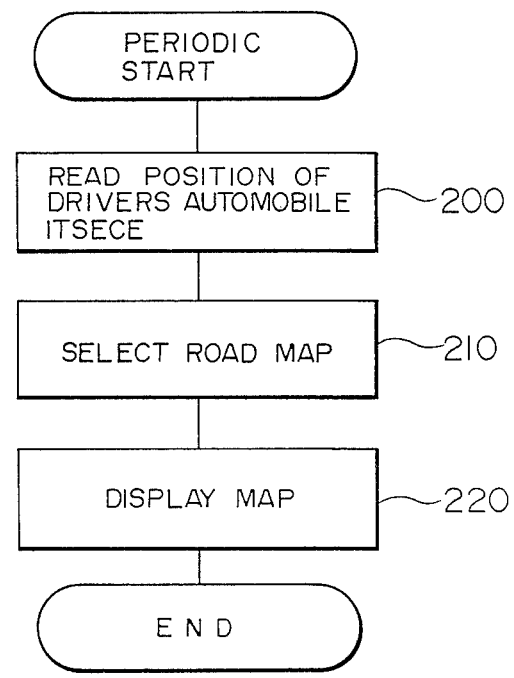
FIG. 6 shows a map display program.

The processing procedure of the program for displaying the road map is shown in FIG. 6. The position of the driver's automobile is read by using the direction sensor and the traveling distance sensor at step 200. The road map showing the area around the position of the driver's automobile is read out from the road map memory unit at step 210. The road map thus read out is shown on the display.

Figure 7:
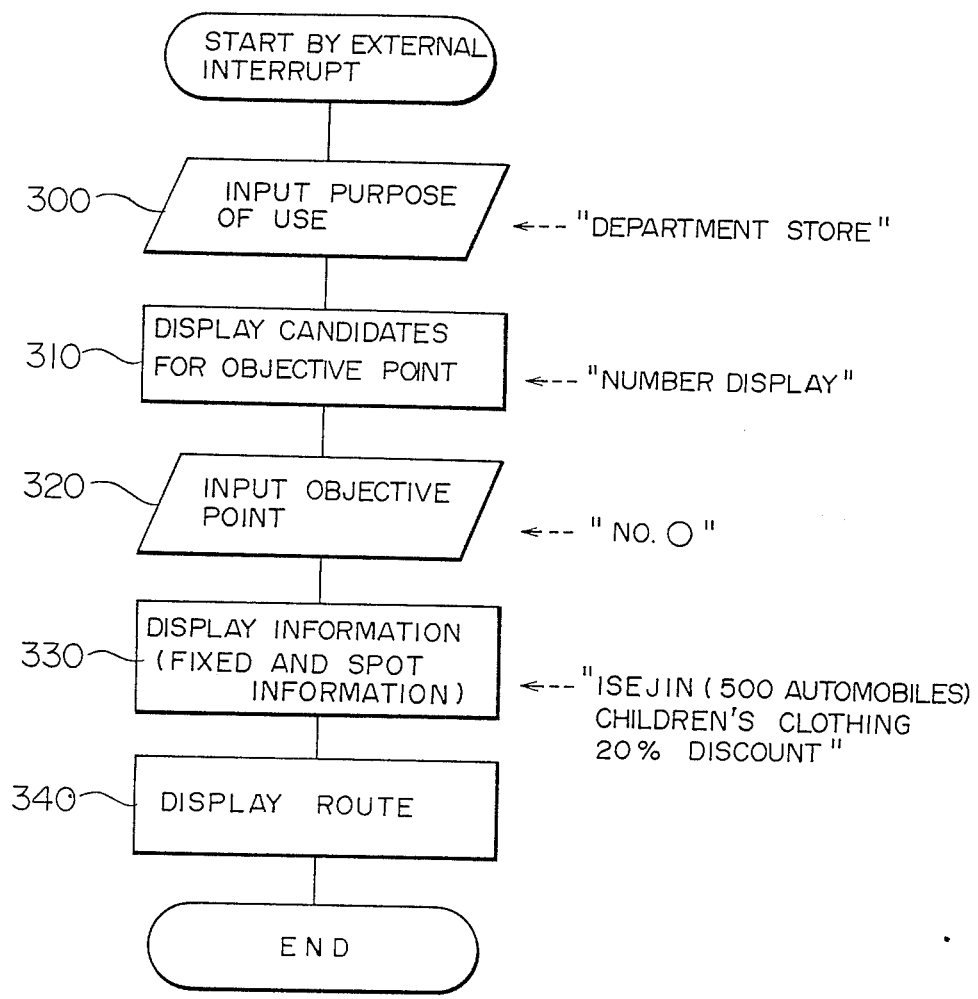
FIG. 7 shows an information search program.

FIG. 7 shows the processing procedure of the information search program, which is started by an external interrupt.

If the driver inputs a purpose of use, such as "department store" at step 300, information concerning department stores is selected out of data shown in FIG. 4 and is displayed in the order of memory number at step 310.

At step 320, information concerning department stores is further selected. A department store destination is inputted by its number.

Figure 8:
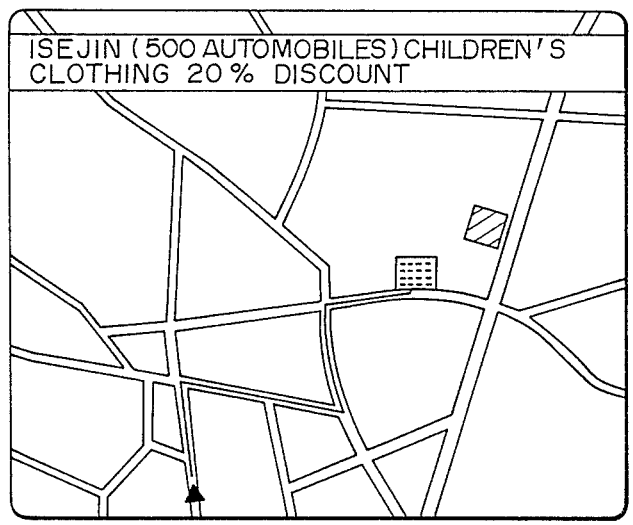
FIG. 8 shows an example of a display on a display unit.

Upon selection of a department store, information, such as fixed information, and spot information is displayed at step 330. The route to the department store is colored on the display, and the road information as shown in FIG. 8 is displayed.

When a driver goes to a town in a car for shopping, the automobile driving guide apparatus of the present embodiment informs the driver, who is not acquainted with the town, of various locations for shopping. Further, even a driver well acquainted with the town can select an optimum place on the basis of spot information relating to a facility having a desired purpose of use.

In accordance with the present invention, a facility which satisfies a desired purpose of use is selected, and the path as far as the selected facility is displayed. As a result, a highly efficient and convenient automobile driving guide apparatus can be obtained.

We claim:

1. An automobile driving guide apparatus comprising:
   (a) input means for allowing a driver to input information indicating the purpose of use of certain facilities;
   (b) related information memory means for storing information concerning locations of facilities related to an inputted purpose of use;
   (c) search means for reading information identifying one or more locations of facilities corresponding to a specific purpose of use, inputted through said input means, from said related information memory means; and
   (d) display means for displaying indicia representing locations of facilities identified by information read by said search means on a road map showing routes to said one or more locations.

2. An automobile driving guide apparatus according to claim 1, further including means for updating information related to locations of facilities in said related information memory means on the basis of external information.

3. An automobile driving guide apparatus for guiding the driver of a vehicle to a destination selected from a category of destinations at which are located facilities having a given purpose of use, comprising:
   memory means for storing map information for generating a map display of a geographical area and destination information of various locations in said geographical area at which facilities are located along with the purpose of use of such facilities;
   input means for receiving from a driver of the vehicle while information indicating a purpose of use of a facility and for generating a signal representing the inputted purpose of use information;
   first means responsive to said signal from said input means for reading from said memory means destination information of locations in said geographical area which have facilities whose purpose of use corresponds to the purpose of use received by said input means from the driver;
   second means for readingmap information from said memory means for generating a map display of said geographical area; and
   display means responsive to said first and second means for displaying a map of said geographical area on which there is superimposed indicia representing the locations of the facilities identified by the destination information read by said first means.

4. An automobile driving guide apparatus according to claim 3, wherein said purpose of use information stored in said memory means includes names of consumer product facilities.

5. An automobile driving guide apparatus according to claim 3, wherein said purpose of use information stored in said memory means includes names of consumer service facilities.

6. An automobile driving guide apparatus according to claim 3, wherein said memory means stores a table of information in which for each of a plurality of purposes of use there is provided information as to a facility and the map address of said facility.

7. An automobile driving guide apparatus according to claim 6, wherein said table of information includes, for at least some of said purposes of use, information as to availability of parking at the facility.

8. An automobile driving guide apparatus according to claim 6, wherein said table of information includes, for at least some of said purposes of use, information as to the consumer products.

9. An automobile driving guide apparatus according to claim 6, wherein said table of information includes, for at least some of said purposes of use, information as to consumer services.

10. An automobile driving guide apparatus according to claim 6, wherein said purpose of use information stored in said memory means includes names of consumer product facilities.

11. An automobile driving guide apparatus according to claim 6, wherein said purpose of use information stored in said memory means includes names of consumer service facilities.

12. A method for guiding a driver of a vehicle to a destination selected from a category of destinations at which are located facilities having a given purpose of use, comprising the steps of:

storing in a memory map information for generating a map display of a geographical area and destination information of various locations in said geographical area at which facilities are located along with the purpose of use of such facilities;

addressing said memory with a selected purpose of use to read out destination information of locations in said geographical area which have facilities whose purpose of use corresponds to said selected purpose of use;

reading said map information from said memory; and displaying on a display device a map of said geographical area based on said read map information and superimposing on said map indicia representing the locations of the facilities identified by said read out destination information.

13. A method according to claim 12, further including the steps of:

selecting one of a plurality of indicia superimposed on the map displayed on said display device;

displaying on said map the present location of said vehicle in the geographical area; and indicating on said map a route between the present location of the vehicle and said selected indicia.

14. A method according to claim 12, wherein said purpose of use information includes names of consumer product facilities.

15. A method according to claim 12, wherein said purpose of use information includes names of consumer service facilities.

16. A method according to claim 12, further including storing in said memory information as to availability of parking at the facility.

17. A method according to claim 12, further including storing in said memory information as to consumer products and services.

* * * * *